Dec. 9, 1958 L. A. RICHARDS 2,863,698
SOIL MOISTURE SENSITIVE AUTOMATIC IRRIGATION SYSTEM
Filed Sept. 24, 1953 4 Sheets-Sheet 1
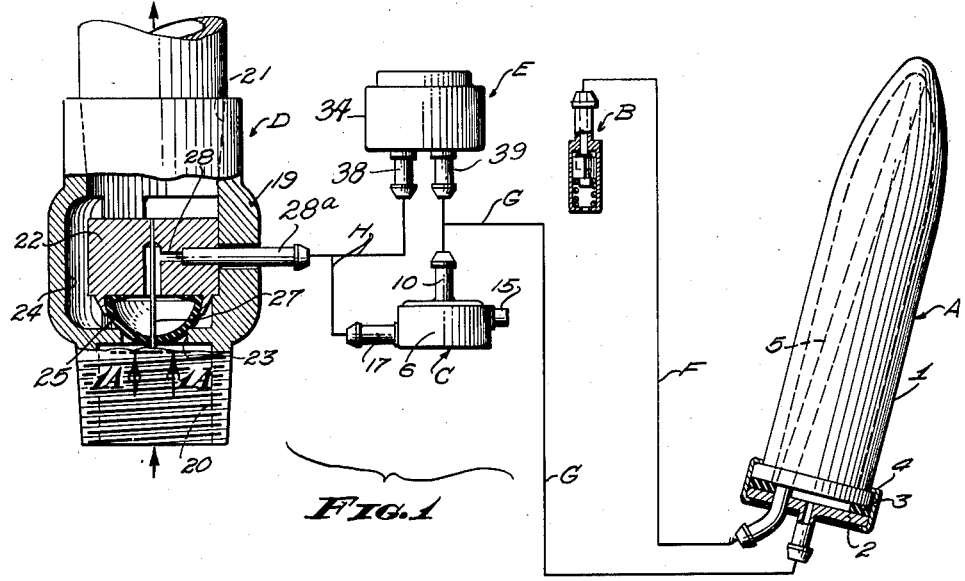
FIG.1
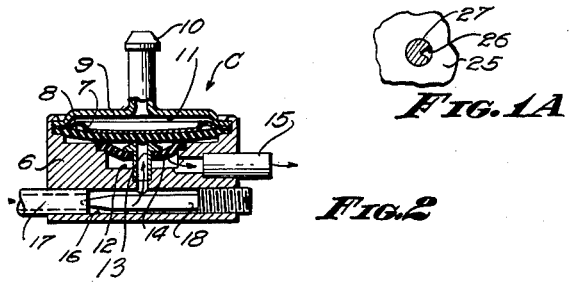
FIG.1A
FIG.2
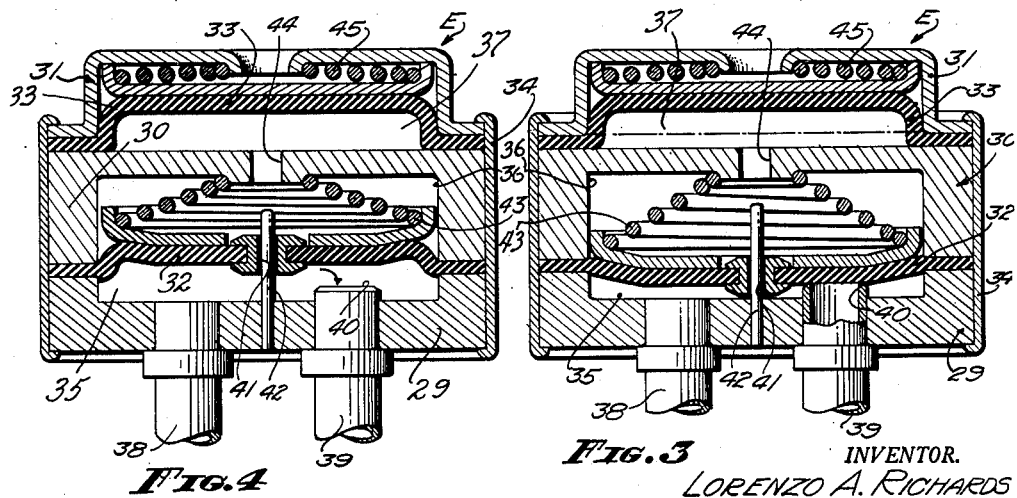
FIG.4 FIG.3
INVENTOR.
LORENZO A. RICHARDS
BY Lloyd Spencer

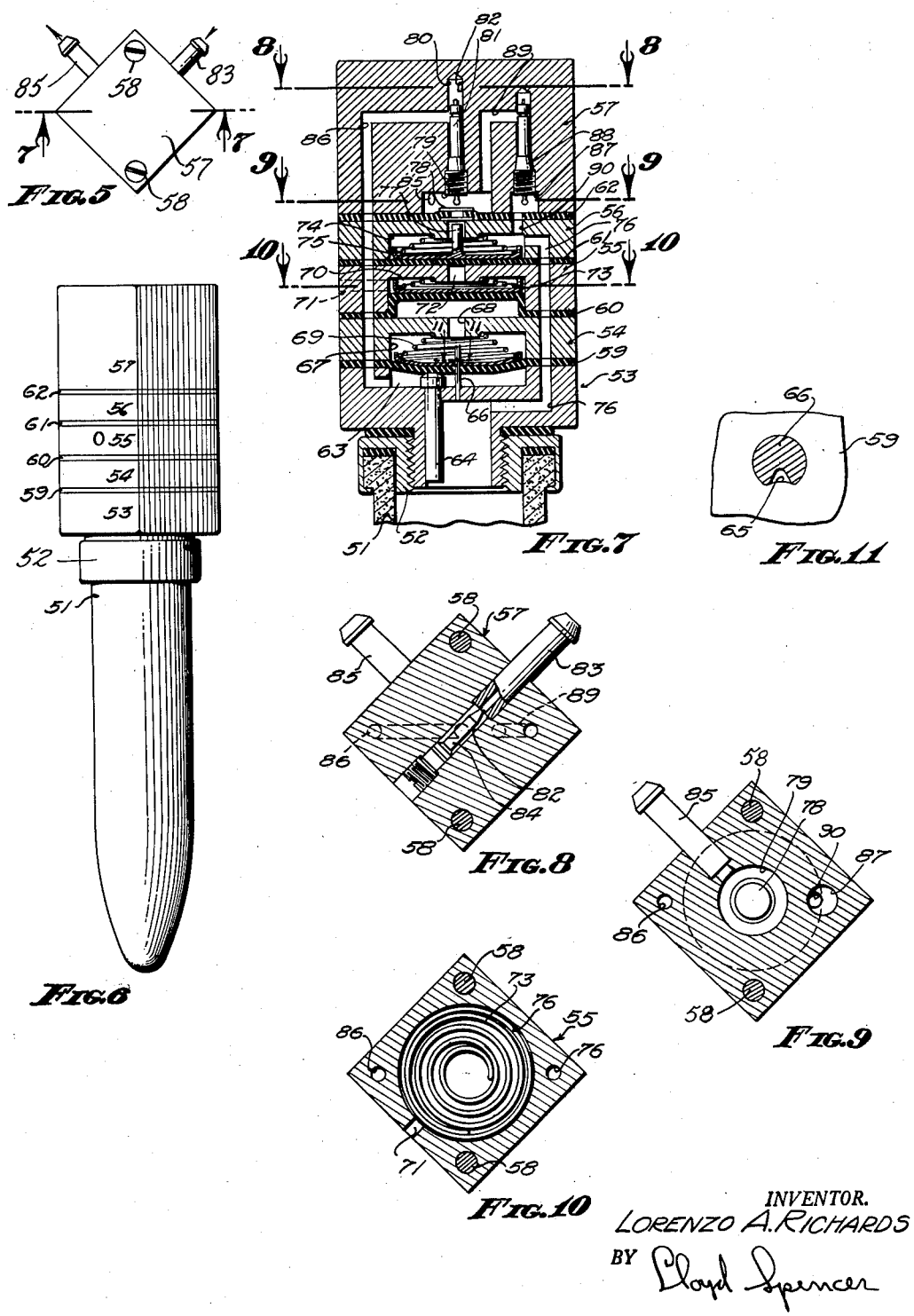

Dec. 9, 1958   L. A. RICHARDS   2,863,698
SOIL MOISTURE SENSITIVE AUTOMATIC IRRIGATION SYSTEM
Filed Sept. 24, 1953   4 Sheets-Sheet 3

INVENTOR.
LORENZO A. RICHARDS
BY Lloyd Spencer

Dec. 9, 1958 L. A. RICHARDS 2,863,698
SOIL MOISTURE SENSITIVE AUTOMATIC IRRIGATION SYSTEM
Filed Sept. 24, 1953 4 Sheets-Sheet 4
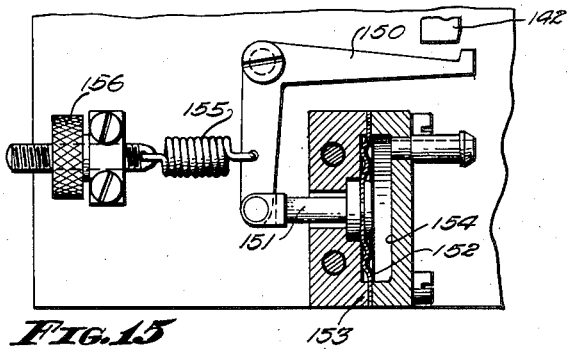
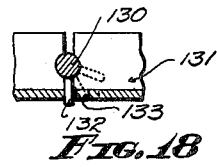
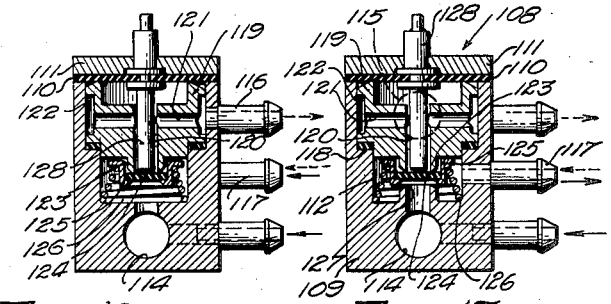
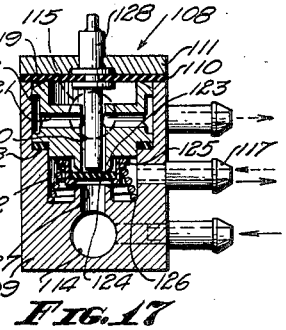
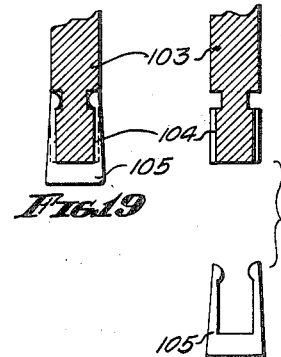
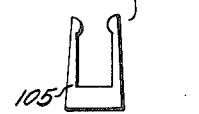
INVENTOR.
LORENZO A. RICHARDS
BY United States Patent Office 2,863,698
Patented Dec. 9, 1958

2,863,698
SOIL MOISTURE SENSITIVE AUTOMATIC IRRIGATION SYSTEM

Lorenzo A. Richards, Riverside, Calif.

Application September 24, 1953, Serial No. 382,231

24 Claims. (Cl. 299—25)

My invention relates to automatic irrigation systems, more particularly to apparatus and methods of supplying water to soil whenever the moisture content of the soil is depleted and then terminating the supply of water when an adequate quantity of water is delivered to the soil.

Included in the objects of my invention are:

First, to provide an automatic irrigation system which utilizes the phenomena evidenced when a hollow ceramic cell is completely filled with water and is buried in wetting contact with the soil; namely, under such conditions, the pressure of the water in the cell approximately equals atmospheric pressure when the soil is wetted to field capacity but drops, producing a vacuum or suction pressure in the cell as the soil moisture is depleted, the degree of vacuum or suction pressure thus reflecting the soil moisture content.

Second, to provide an automatic irrigation system wherein, between cycles of operation; that is, momentarily, when the moisture sensitive cell has an internal pressure approximating atmospheric pressure, water is circulated through the cell to purge the cell of any accumulated air; thereby, in effect "resetting" the cell and preventing a continued accumulation of entrapped air from diminishing the effectiveness of the moisture sensitive cell.

Third, to provide an automatic irrigation system having a self-purging arrangement whereby the system is capable of operation for months or even years without attention and which is capable of remaining dormant during rainy seasons and without attention or service return to operation during dry seasons.

Fourth, to provide an automatic irrigation system which enables the moisture sensitive cell to be buried in the most effective or optimum place in the soil without necessitating provisions for access or inspection of the cell while in service.

Fifth, to provide a self-purging means of this type which may be arranged for the control of a single irrigation line or a complex irrigation system wherein a large number of sections or areas are progressively irrigated in accordance with a pre-established program.

Sixth, to provide an automatic irrigation system which, in one form, is incorporated into a self-contained unit.

Seventh, to provide an automatic irrigation device which may be so arranged that the cyclic changes in pressure in the moisture sensitive cell and the pressure of the irrigation water controlled thereby produces a momentary condition in each cycle wherein purging water flows through the moisture sensitive cell.

Eighth, to provide a program irrigation system involving cam operated irrigation control valves and cam controlled means for effecting flow of purging water at the completion of the soil watering program.

Ninth, to provide on the whole a novel method of effecting automatic irrigation.

With the above and other objects in view as may appear hereinafter, reference is directed to the accompanying drawings, in which:

Figure 1 is a composite partially diagrammatical, partially sectional view of one form of my automatic irrigation system showing the various component parts.

Figure 1A is an exaggerated fragmentary view taken through 1A—1A of Fig. 1 showing the booster valve bleed port.

Figure 2 is an enlarged transverse sectional view of the pilot valve, employed in the system shown in Fig. 1.

Figure 3 is an enlarged transverse sectional view of the purge valve employed in the system shown in Fig. 1, the purge valve being shown in its normal or inoperative position.

Figure 4 is a similar enlarged transverse sectional view of the purge valve shown in its purging or operating position.

Figure 5 is a plan view of a self-contained control valve wherein the flow and purge valves are incorporated into one unit.

Figure 6 is a side view thereof shown in conjunction with a moisture sensitive cell.

Figure 7 is an enlarged sectional view thereof taken through 7—7 of Fig. 5.

Figures 8, 9 and 10 are transverse sectional views througe 8—8, 9—9, and 10—10 of Fig. 7.

Figure 11 is an enlarged fragmentary sectional view through 11—11 of Fig. 7.

Figure 12:
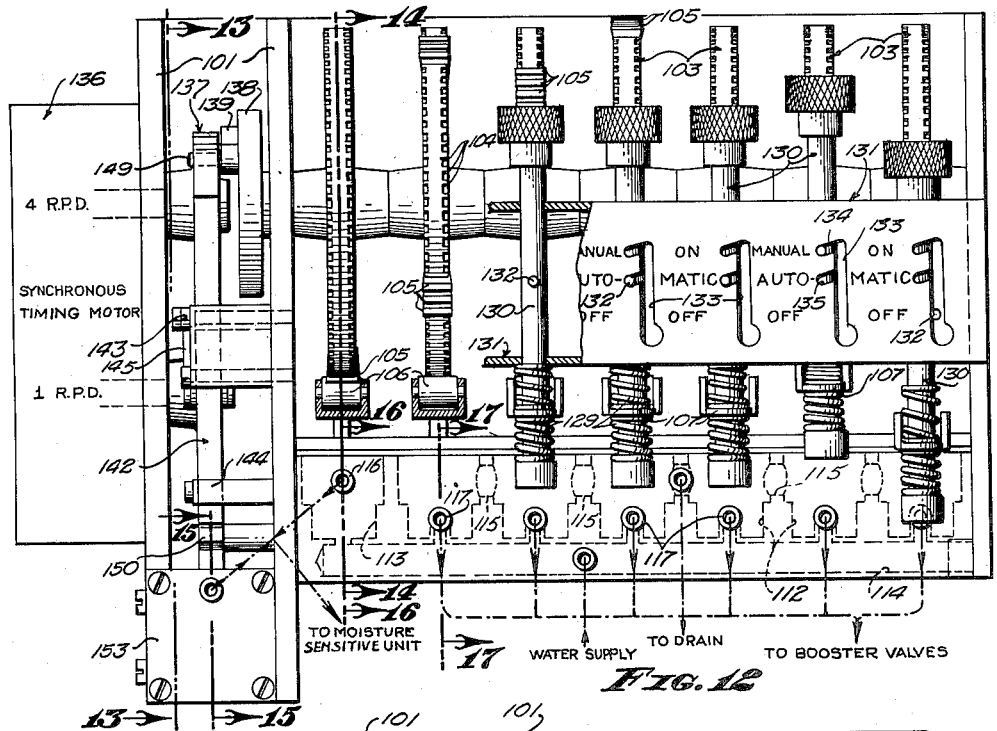

Figure 12 is a partially sectional partially side view of a program irrigation apparatus incorporating a purging means for the moisture sensitive element.

Figure 13:
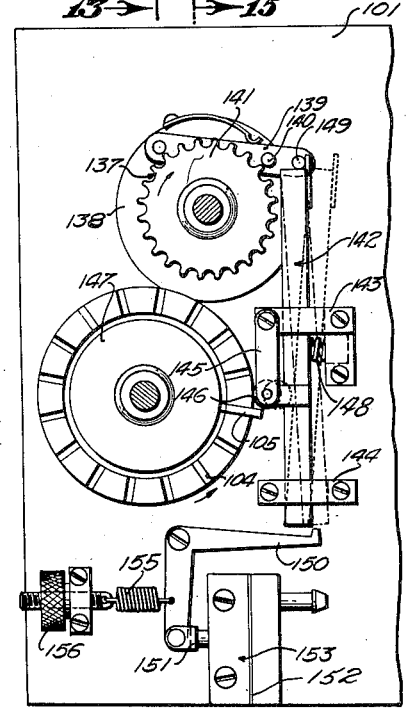

Figure 13 is a transverse sectional view thereof taken along the line 13—13 of Fig. 12.

Figure 14:
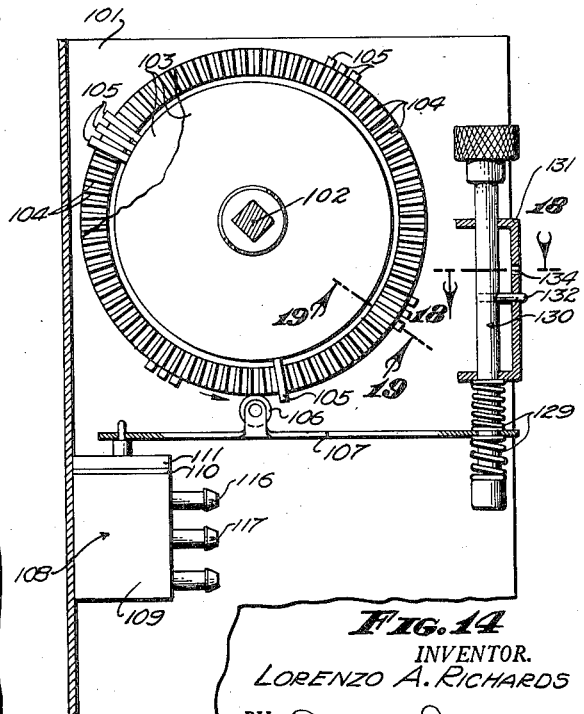

Figure 14 is a transverse sectional view thereof taken along the line 14—14 of Fig. 12.

Figure 15 is an enlarged fragmentary sectional view thereof taken along the line 15—15 of Fig. 12.

Figure 16 is an enlarged sectional view of the purge valve taken through 16—16 of Fig. 12.

Figure 17 is an enlarged sectional view of one of the pilot valves taken through 17—17 of Fig. 12.

Figure 18 is an enlarged fragmentary sectional view of a pilot valve control stem taken through 18—18 of Fig. 14.

Figure 19 is an enlarged fragmentary sectional view of a timing cam wheel taken through 19—19 of Fig. 14 showing a timing cam element thereon.

Figure 20 is a composite view similar to Fig. 19 but showing the timing cam wheel and timing cam element separated.

Reference is first directed to Figs. 1 through 4. The construction here shown includes generally, a hollow moisture sensitive cell A, a check valve B, a pilot valve C, a booster or irrigation valve D, and a purging valve E. The moisture sensitive cell A is connected to the check valve B, by a purge line F. The moisture sensitive cell A, the pilot valve C and the purging valve E are interconnected by a pressure sensing line G. The pilot valve C, booster valve D and purging valve E are interconnected by a bleed line H.

The moisture sensitive cell A includes a ceramic tube 1 closed at one end and provided with a flange at its other end covered by a cap 2. A sealing ring 3 is interposed between the flange and cap and the assembly is held in place by a clamping band 4. The cap is provided with a nipple communicating with the pressure sensing line G. Sealed in the cap and connected with the purge line F is a purge tube 5 which extends to the extreme or closed end of the ceramic tube. In practice the ceramic tube is so mounted that its closed end is uppermost so that any air is entrapped at this end for removal through the purge tube. If it is desired to mount the ceramic tube 1 in any other position, the intake end of the purge tube is relocated so that its intake end occupies the uppermost region of the ceramic tube, or the highest point in the line leading thereto; that is wherever the air to be purged may accumulate.

The check valve B may be any conventional type of check valve of appropriate size designed to permit outflow of water from the purge line F but prevent inflow of water or air into the purge line.

The pilot valve, shown best in Fig. 2, includes a valve body 6 in the form of a short cylinder. One end is recessed to receive a snap acting diaphragm 7 backed on its inner side by a valve disk 8 of yieldable material. The diaphragm is covered by a cap 9 sealed to the margins thereof by an inturned lip forming a part of the valve body. The cap 9 is provided with a nipple 10 for connection to the pressure sensing line G. Between the cap 9 and diaphragm 7 there is formed a pressure sensing chamber 11.

Below the valve disk 8, the valve body 6 is provided with a cavity 12. Projecting axially through the cavity is a short tube which engages the valve disk 8 and forms a bleed valve 13. Surrounding the bleed valve 13 and engaging the periphery of the cavity 12 is a back pressure disk 14 of yieldable material normally engaging a shoulder formed under the tip end of the bleed valve 13. A lateral bleed port 15 leads from the cavity 12 to the atmosphere.

The short tube which forms the bleed valve 13 communicates with a throttle passage 16 traversing the valve body. One end of the throttle passage 16 receives an intake nipple 17, while the other end receives a needle valve 18 screwthreaded therein and having a pointed tip cooperating with the intake nipple 17 to regulate flow therefrom through the bleed valve 13. However, by providing the back pressure disk 14 the needle valve may be omitted. The intake nipple 17 communicates with the booster valve D and purge valve E through the bleed line H.

The booster valve D shown in Figure 1 may be any conventional pilot control valve arranged, when open, to bleed water through a pilot valve. The particular booster valve illustrated includes a body 19 having a coaxial inlet 20 and outlet 21 permitting the valve body 19 to be interposed in a water line connected to a sprinkler or other irrigation means, not shown.

Set into the valve body 19 between the inlet and outlet is a valve block 22. An inlet port 23 is located below and spaced from the valve block, and flow passages are provided around the valve block to the outlet 21. Set into 24 the bottom end of the valve block by its margins is a hollow hemispherical valve element 25 formed of yieldable material. The valve element 25 is provided with a bleed port 28 communicating with the inlet end of the booster valve and restricted by a choke stem 27. The interior of the valve element forms with the valve block a back pressure chamber of sufficient area that when the water pressure within the valve element 25 equals the line pressure at the inlet, the valve element is held in its closed position. The back pressure chamber communicates with a bleed outlet nipple 28a connected with the bleed line H.

The purge valve E, shown best in Figs. 3 and 4, includes a bottom valve body 29 and a top valve body 30 in the form of cylindrical disks, and a cap 31. Interposed between the two valve bodies 29 and 30 is a diaphragm 32 of yieldable material. Interposed between the upper valve body 30 and the cap 31 is a diaphragm 33 also of yieldable material. The assembly comprising the valve bodies cap and diaphragms are held together by a clamping band 34.

The lowermost valve body 29 and diaphragm 32 define a bottom chamber 35; the upper valve body 30 and diaphragm 32 form an intermediate chamber 36; and the upper valve body 30 and upper diaphragm 33 form an upper chamber 37.

The lower body member is provided with a bleed line inlet nipple 38 and a purge line outlet nipple 39. The outlet nipple 39 projects into the lower or bottom chamber 35 for sealing engagement by the lower diaphragm 32. The lower diaphragm 32 is provided with a central aperture which may be lined with a metal grommet to form a bleed port 41. Fixed in the lower body member 29 is a choke stem 42 which extends upwardly through the bleed port 41 to restrict the effective opening thereof.

A spring 43 within the intermediate chamber 36 bears against the diaphragm 32 to urge it toward its lower position. A port 44 communicates between the intermediate chamber 36 and upper chamber 37. A spring 45 disposed under the cap 31 urges the upper diaphragm 33 downwardly. The cap 31 is apertured to expose the upper side of the upper diaphragm 33 to atmospheric pressure.

Operation of the automatic irrigation system shown in Figs. 1 through 4 is as follows:

The moisture sensitive unit A is buried in the ground at any location which has a moisture condition corresponding to the region or area to be irrigated. When constructed as illustrated, the moisture sensitive unit is buried with the closed end of the ceramic cell directed upwardly. The check valve B is located any place, either close to or remote from the moisture sensitive unit A, which will not interfere with the drainage of water from the check valve.

The pilot valve C, purge valve E and booster valve D may be located in adjacent or remote relation with each other. The booster valve D is connected into a water supply line leading to a sprinkler head, several sprinkler heads, or other irrigation means servicing the region to automatically be controlled. The interconnecting lines F, G and H may be small diametered tubing of either metal or plastic.

The ceramic cell has capillary pores. On filling the cell with water, the water fills these pores. The pore size and the surface tension of the water causes the water within the ceramic cell to resist migration into the surrounding soil as the water in the soil is depleted.

Such depletion of soil moisture causes an outward movement of water from the porous cell with a consequent reduction in pressure within the ceramic cell, depending upon the pore size and character of the pore space in the ceramic cell. This outward water movement may create a vacuum or suction pressure within the porous cell as high as eighteen to twenty-four inches of mercury. Under reduced pressure, any occluded air is released and collects at the upper end of the ceramic cell. The air is not re-absorbed into the water on return to atmospheric pressure. Also, if the suction in the surrounding soil exceeds the pressure within the ceramic cell, there will occur a gradual depletion of the water within the cell and a substitution of air.

When the ceramic cell is full of water, or virtually so, a small volumetric displacement of water will create a substantial vacuum or suction capable of operating the pilot valve. If the accumulation of air be excessive, a much greater volumetric displacement of water must occur to establish an operating vacuum or suction. It is desirable therefore that no appreciable accumulation of air be permitted. This is the function of the purge valve E.

Assuming an initial condition in which the ceramic cell 1 of the moisture sensitive unit A is filled with water; the booster valve D is closed as shown in Fig. 1; the pilot valve is closed as shown in Fig. 2; and the purge valve E is closed as shown in Fig. 3; then, upon depletion of water in the soil surrounding the ceramic cell 1, a vacuum or suction pressure is created in the ceramic cell which eventually is sufficient to operate the pilot valve C and cause the valve disk 8 to rise off the bleed valve 13. This causes the pressure within the dome shaped valve 25 of the booster valve to drop because of bleeding of liquid therefrom through the pilot valve C so that the water pressure at the inlet end of the booster valve may open the booster valve and cause flow to the sprinkler or other irrigation device controlled thereby. Water continues to bleed through the bleed port 26 of the booster valve, through the bleed line H, through the bleed valve 13 of the pilot valve and out the bleed port 15 so long as the valve D is open.

The only effect this has on the purge valve E is to reduce the water pressure in the chambers 35 and 37 thereof causing the upper diaphragm to descend to the broken line position shown in Fig. 3 under urge of the spring 45. During the watering cycle, that is during the time the booster valve D is open, the purge outlet 39 remains closed.

When the soil moisture in the region around the ceramic cell 1 reaches field capacity, the vacuum or suction pressure is relieved and the diaphragm 7 snaps the bleed valve 13 closed. Pressure in the valve element 25 then builds up to line pressure as the water entering said valve element through the bleed port 26 of the booster valve cannot escape. The booster valve is thus caused to close.

Simultaneously, the rise in pressure in the bleed line H causes the lower and upper diaphragms 32 and 33 of the purge valve E to rise as shown in Fig. 4. This opens the purge outlet 39 permitting water to flow to the moisture sensitive unit A through the pressure sensing line G forcing air and water through the purge line F and out the check valve B. This flow continues until sufficient water has passed the bleed port 41 of the purge valve E and entered the chambers 36 and 37 to allow the diaphragm 32 to move downward under the combined action of the spring 43 and water pressure in chamber 36 and close the outlet 39 as shown in Fig. 3. This momentary flow is ample to remove any accumulation of air in the moisture sensitive unit A.

Reference is now directed to the construction shown in Figs. 5 through 11. The construction here shown is a self-contained unit performing all the functions of the moisture sensitive unit A, check valve B, pilot valve C, and purge valve E of the first described construction, and may be used with or independently of a booster valve.

The self-contained unit includes a ceramic cell 51 in the form of a tube closed at its lower end and provided with a flange at its upper end to which is sealed an adapter fitting 52 having internal screwthreads. A stack of valve body sections 53, 54, 55, 56 and 57 are secured together by screws 58. The lower body section 53 is provided with an externally screwthreaded nipple which fits into the adapter fitting 52. Diaphragms 59, 60, 61 and 62 are clamped between the stack of valve body sections.

The lower body section 53 is recessed at its upper side to form with the lower diaphragm 59 a purge supply chamber 63. A short purge supply tube 64 extends from the chamber 63 into the ceramic cell 51. The upper end of the tube protrudes into the chamber 63 and terminates in a valve seat engageable by the diaphragm 59. The valve thus formed is normally closed; and is open only during the purging cycle to be described hereinafter.

The diaphragm 59 is provided with a central purge control port 65 restricted by a choke stem 66 fixed in the body section 53 and having a groove along one side as shown in Fig. 11. The second body section 54 forms with the diaphragm 59 a purge control chamber 67 which communicates with the under side of the second diaphragm 60 through a port 68. A spring 69 within the chamber 67 urges the diaphragm 59 downwardly.

The third body section 55 forms with the second diaphragm 60 an atmosphere chamber 70 having a lateral atmosphere port 71 and a port 72 communicates through the body section 55, to the under side of the third diaphragm 61 so that this underside of diaphragm 61 and the top side of diaphragm 60 are at all times subjected to atmospheric pressure. A spring 73 in the atmospheric chamber 70 urges the diaphragm 60 downward.

Above the third diaphragm 61 the fourth body section 56 forms a pressure sensing chamber 74. A spring 75 in this chamber urges the diaphragm 61 downwardly. A passageway 76 leads from the chamber 74 through the marginal portions of the body sections 56, 55, 54 and 53 to the extreme upper end of the ceramic cell 51. The screwthreaded nipple forming the lower end of the lower body section may be recessed for this purpose. The body section 56 is provided with a central aperture exposing the under side of the top diaphragm 62 to the pressure sensing chamber. A stem 77 is supported by the diaphragm 61 and extends through the aperture to engage the diaphragm 62. At the point of engagement of the stem 77 the diaphragm 62 may have a reinforcing disk 78.

The upper body section 57 is provided at its underside with a recess 79 of smaller diameter than the pressure sensing chamber 74 which confronts the central portion of the upper diaphragm 62. A centered socket 80 extends upwardly from the recess 79 and receives a valve element 81. The valve element 81 may be a conventional tire valve with its operating tip disposed contiguous to the reinforced center 78 of the diaphragm 62. The valve element 81 is normally closed but opens with upward movement of the diaphragm 62.

The upper end of the socket 80 is intersected by a transversely extending water inlet port 82 fitted in one end with an inlet nipple 83 and in the other end with a needle valve 84 cooperating with the inlet nipple to control the rate of water flow. The recess 79 is provided with a water outlet port 85.

A passageway 86 extends from the socket 80 down the margins of the valve body sections 57, 56, 55, 54, and 53 and communicates with the purge chamber 63 under the diaphragm 59.

The top body section 57 is provided with a socket 87 offset from the socket 80 and fitted with a valve element 88 which may be a tire valve identical to the valve element 81. The valve element 88 serves as a check valve or purge relief valve. The upper end of the socket 87 communicates through a passage 89 with the recess 79 and hence with the water outlet port 85. The lower end of the socket 87 communicates through a port 90 with the pressure sensing chamber 74.

Operation of the unitary valve construction shown in Figs. 5 through 10 is as follows:

Assuming the porous ceramic cell 51, passageway 76, and pressure sensing chamber 74 are full of water, and the soil surrounding the cell 51 is in a moistened condition; then, the water inlet valve element 81 as well as the purge relief valve 88 will be closed. The several diaphragms will be in the positions shown in Fig. 7; that is, the upper two diaphragms 62 and 61 will be in their lower positions, the next diaphragm 60 will be raised due to the presence of water under pressure filling the purge timing chamber 67 and purge chamber 63 equalized through the purge control port 65. The spring 69 holds the lower diaphragm 59 against the purge tube 64.

As the soil moisture is depleted, an increased vacuum or suction pressure will be created in the ceramic cell 51, passageway 76 and the pressure sensing chamber 74 until the atmospheric pressure in the atmosphere chamber 70 will raise the diaphragm 61 and stem 77 so as to engage the reinforcing disk 78 and cause it to engage the valve operating stem of the valve element 81.

When the valve element 81 opens, water flows from a supply connected with the inlet nipple 83 and out the water outlet port 85. If the area serviced by the valve unit is relatively small, then the water passing through the valve may constitute the irrigation water. However, the inlet nipple 83 may be connected to a bleed line of a booster valve such as the valve D of the first described structure.

During the irrigation cycle the water pressure in the passage way 86 and purge chamber 63 drops dues to the restriction afforded by the needle valve 84. Because of the port 65 through the lower diaphragm 59, the pressure in the puge timing chamber 67 will drop, permitting the diaphragm 60 to lower under urge of the spring 73.

When the soil moisture again approaches field capacity, the vacuum or suction pressure in the ceramic cell 51 and sensing chamber 74 is relieved permitting the diaphragm 61 to return to the position shown in Fig. 7. When this occurs, the pressure in the passageway 86 and purge chamber 63 rises causing the lower diaphragm 59 and diaphragm 60 to rise admitting water to the purge tube 64. The water entering the purge tube 64 forces any air present in the top of the ceramic cell 51, through passageway 76 and pressure sensing chamber 74 out of the purge relief valve 88 and outlet port 85. The purge cycle continues until sufficient water flows through the purge control port 65 to equalize pressures above and below the diaphragm 59. The various diaphragms will now be in their initial position shown in Fig. 7.

Reference is now directed to Figs. 12 through 20 which illustrate a program irrigator dual controlled by a clock and moisture sensitive unit. In the construction here illustrated a suitable frame 101 supports a cam shaft 102 on which are mounted a series of cam wheels 103, one for each section or area to be irrigated and one to control the purge cycle as will be brought out hereinafter.

Each cam wheel 103 is provided with a plurality radially extending slots 104 each of which receives a U-shaped cam clip 105 as shown best in Figs. 19 and 20. The cam wheels are intended to rotate slowly, for example, one rotation in a six-hour cycle. The cam clip slots 104 are sufficiently close that each cam clip 105 may control a period of, for example, four and one-half minutes or other selected interval. By grouping two or more clips together any multiple of the selected interval may be obtained.

Each cam wheel is engaged by a cam follower or roller 106 disposed intermediate the ends of a lever 107. One end of each lever is fulcrumed by means to be described hereinafter whereas the other end operates one unit of a gang valve 108. The gang valve or multiple valve is housed in a valve body 109 supported from the frame 101. The valve body is provided with a series of valve sockets covered by a common gasket 110 and a cover 111. All but one of these sockets, designated 112, are utilized to form pilot or booster control valves shown best in Fig. 17. The remaining socket, located at one end and designated 113, is utilized to form a purge valve, shown best in Fig. 16.

A longitudinally extending water inlet passage 114 is provided in the valve body below the sockets 112 and 113 and communicates therewith through individual ports. The pilot valve sockets 112 are serially connected near their upper ends by a common water outlet passage 115. The purge valve socket 113 is intersected near its upper end with a separate water outlet port 116. Each pilot valve socket 112 is intersected intermediate its ends by a booster valve port 117.

The sockets 112 and 113 are counterbored in their upper portions to form shoulders 118 immediately below the water outlet passage 115 and water outlet port 116 respectively. Interposed between and sealing against each shoulder 118 and overlying gasket 111 is a valve core 119 in the form of a short cylinder having a vertical bore 120 and a cross bore 121, the latter intersecting a peripheral channel 122, to provide serial communication through the water outlet passage 115 in the case of the sockets 112, and discharge through the outlet port 116 in the case of the socket 113.

The lower end of the vertical bore 120 in each core 119 including the core of the purge valve socket, terminates in a valve seat 123. A valve disk 124 is yieldably held against each valve seat 123 by a retainer 125 and spring 126. The water inlet port in each pilot valve socket 112, but not the purge socket 113, terminates in a valve seat 127 confronting the valve seat 123, so that in the pilot valve sockets, the valve washers may engage either seat 123 or seat 127.

The vertical bore 120 loosely receives a valve stem 128 which projects through the cover 111 and sealingly clamps the gasket 110. Valve stems 128, when depressed, force the valve disks 124 from their seats 123, and, in the case of the pilot valve sockets, force the valve disks 124 against the water inlet seats 127.

The upper or exposed end of each valve stem is engaged by one end of a corresponding cam follower lever 107. The opposite or fulcrum end of each cam follower lever 107 is interposed between a pair of coil springs 129 mounted on a stem 130 extending through the lever. The stems are slidably supported in a row between the flanges of a channel bracket 131 forming a part of the frame 101. Each stem is provided with a laterally directed pin 132 adapted to move in a vertical slot 133 formed in the web of the channel bracket. Each slot is provided with lateral notches 134 and 135 at its upper and mid-portion. The purpose of providing vertical adjustment of the fulcrum end of each cam follower lever will be brought out in more detail hereinafter.

A small electric motor 136 operating through a clutch 137 drives the cam shaft 102. The clutch includes a disk 138 at one end of the cam shaft 102 which carries a dog lever 139 having a dog pin 140 which is spring urged into engagement with a drive disk 141 attached to the motor shaft. The drive disk 138 is provided with peripheral teeth which afford a drive connection through the dog pin 140.

It is desired that the clutch be normally disengaged, and when engaged cause a single revolution of the cam shaft and then be automatically disengaged. This is accomplished by a trip bar 142 retained between guides 143 and 144. The trip bar is capable of limited pivotal movement about either its upper or lower end and is held against longitudinal travel by a link 145 depending from the guide 143.

At its mid-point or a little below, the trip bar 142 is provided with a cam follower 146 which engages a timing cam wheel 147 driven from a second shaft extending from the drive motor 136. The second shaft preferably turns at one revolution per day. The timing cam wheel 147 is provided with radial slots 104 and receive cam clips 105 in the manner of the cam wheels 103. The trip bar 142 is backed by a spring 148 adjacent to its mid-portion which urges the cam follower 146 against the guides 143 and 144.

The dog lever 139 is provided with a stop pin 149 which engages the upper end of the trip bar 142 and causes the dog pin 140 to disengage the drive disk 141. The stop pin 149 also serves as a fulcrum point for the lever when the cam follower 146 engages a cam clip 105, unless the lower end of the trip lever is restrained.

To restrain the lower end of the trip lever and thus cause its upper end to disengage the stop pin 149, a latch lever 150 having a catch at one end is provided. The other end of the latch lever is connected to a stem 151 attached to a diaphragm, 152, Fig. 15, within a valve housing 153. The diaphragm forms with the housing a pressure sensing chamber 154 adapted to be connected with a moisture sensitive cell such as shown in the previously described structures. A tension spring 155 and adjustment screw 156 is so attached to the lever as to vary the vacuum pressure required to cause the latch lever to engage the lower end of the trip bar 142. With this arrangement, cam clip of the timing wheel 147 does not cause the trip lever 141 to permit the clutch 137 to engage unless the vacuum pressure in the chamber 154 is sufficiently high to cause the latch lever 150 to restrain the trip bar 142.

Operation of the automatic irrigation mechanism shown in Figs. 12 through 20 is as follows:

The booster valve port 117 of each pilot valve socket 112 is connected by a suitable tube, which may be of small diameter, to a suitable booster valve controlling an irrigation line of any desired size. By way of example, but not limitation, the booster valve may be similar to the booster valve D shown in Fig. 1 (but without the bleed port 26) or in the form shown in Fig. 2 of my copending application Serial Number 156,317, filed April 17, 1950, now abandoned, and entitled Remote Control Valve. Thus, the booster valve may be so arranged that when line pressure is applied through the booster valve port 17, due to its communication with the water supply passage 114, the booster valve is closed; but when the booster valve port 117 is in communication with the water outlet passage 115, water is bled from the booster valve and the booster valve is caused to open. Thus, when the valve disk 124 is in its normal position engaging the seat 123 the corresponding booster valve is closed; whereas, when the valve stem 128 depresses the valve disk to close the water inlet seat 127 communication is established through the vertical bore 120, cross bore 12, and channel 122 to the water outlet passage 115.

The on and off periods of the booster valves and the irrigation areas controlled thereby is determined by the number and arrangement of the cam clips 105 in the corresponding cam wheels 103. Thus, it can be seen that during a single rotation of the cam shaft 102 and its cam wheels 103 the various irrigation areas may be watered in any desired sequence or duration; furthermore; they may be watered repeatedly for short durations during the cycle if run-off conditions require.

The stems 130 which support the fulcrum ends of the cam levers 107 enable the individual pilot valves and their booster valves to be turned off or on manually. That is, by lifting a stem 130 to engage its pin 132 in the uppermost notch 134 of the slot 133 the corresponding pilot valve and booster valve is turned on irrespective of the cam clips 105 and is thus in "manual" position. When the pin 132 is in the next notch 135, the corresponding pilot valve is in "Automatic" position. If the pin 132 is dropped to the bottom of the slot 133, the corresponding cam follower clears the cam clips and the pilot valve remains in its "Off" position.

As indicated hereinbefore, the cam shaft 102 is permitted by the clutch 137 to make only one revolution then stop. The clutch cannot, however, initiate rotation of the cam shaft until two events occur. First, the moisture sensitive cell such as the cell shown in connection with the first described constructions, must indicate a moisture depletion of the surrounding soil by creating the required vacuum in the chamber 154 and cause the latch lever 150 to restrain the lower end of the trip bar 142. Second, while the trip bar is so held, the cam clip on the timing cam wheel 147 must engage the cam follower 146 to tilt the upper end of the trip bar away from the stop pin 149 to permit the dog pin 140 to engage the drive disk 141.

It should be observed, the cam shaft may be manually turned forward at any time by manually moving the trip bar 142 momentarily clear of the pin 149 and thus allowing the dog lever 139 to ratchet forward around the wheel 141. This is desirable for purposes of changing cam settings.

The cam wheel associated with the purge valve socket 113 need have but a single cam clip so positioned as to engage the corresponding valve stem 128 at the completion of the irrigation cycle; that is, just before the cam shaft 102 completes its single rotation. The outlet port 116 communicates with the pressure sensing chamber 154 and the moisture sensitive cell so that when the stem 128 of the purge valve socket is depressed, water is flushed for a limited period through the moisture sensitive cell to purge the air therefrom. It should be noted that the moisture sensitive porous cell is provided with a purge discharge line and check valve such as the check valve B of the first described construction.

It will thus be seen that the automatic or program irrigation system may be arranged to operate, for example, only between twelve P. M. and six A. M., and then only when during the preceding interval the soil moisture has been sufficiently depleted. Should the region surrounding the moisture sensitive cell be insufficiently watered during the cycle provided, the vacuum pressure will re-establish itself after purging within the eighteen hours before the next cycle.

It should be observed that, while reference has been made to an "atmospheric" pressure condition in the porous cup at the time the soil is wetted, in practice this is not necessary. That is, the supply of water may be shut off at some predetermined suction pressure lower than the suction pressure at which the watering cycle is commenced, but still not go to atmospheric pressure, which corresponds to zero suction pressure.

Although I have shown several embodiments of my invention, I do not wish to be limited thereto but desire to include in the scope of my invention all novelty inherent in the appended claims.

I claim:

1. An automatic means for reconditioning a moisture sensing unit employed in connection with an irrigation apparatus, wherein said unit is a closed porous cell which, whenever the cell is filled with water and its exterior exposed to a moist environment, a low suction condition obtains within the cell and whenever the exterior of the cell is exposed to a moisture deficient environment a correspondingly higher suction condition obtains within the cell, and wherein an irrigation initiating element responsive to a predetermined high suction condition within said cell causes operation of the irrigation apparatus, said automatic reconditioning means comprising: valve means controlling ingress and egress of water to and from said cell at a pressure in excess of atmospheric pressure; and an automatic device subject to operation of said irrigation apparatus for momentarily opening and then closing said valve means to cause outflow from said cell of gases which may have accumulated therein and to refill said cell with water above atmospheric pressure whereby said cell is automatically reconditioned to cause reoperation of said irrigation initiating element in the event of reexposure of said cell to said moisture deficient environment.

2. An automatic reconditioning means as set forth in claim 1 which is employed in connection with an irrigation apparatus that includes a programming controller subject to the joint operation of said irrigation initiating element and an irrigation period selecting timer, wherein said automatic device is incorporated in said controller.

3. An automatic reconditioning means as set forth in claim 1 which is employed in connection with an irrigation apparatus including a programming controller having a plurality of actuating elements arranged to operate a series of irrigation valves in predetermined sequence, wherein: said automatic device is incorporated in an additional actuating element operated in timed relation with the other actuating elements.

4. An automatic reconditioning means as set forth in claim 1 which is employed in connection with an irrigation apparatus including a booster valve and pilot valve connected with the booster valve through a bleed line, the bleed line having a reduced pressure during operation of said booster valve and a higher pressure on termination of operation of said booster valve, said pilot valve constituting said initiating element, wherein: said automatic device includes a housing; a diaphragm dividing said housing into opposed chambers interconnected by a bleed passage, whereby, on application of said high pressure in one of said chambers, said diaphragm is moved momentarily until pressure is equalized through said bleed passage, said diaphragm being operatively connected with said valve means.

5. An automatic reconditioning means as set forth in claim 1 which is employed in connection with an irrigation apparatus that includes a pressure line in which a lower pressure exists during operation of the irrigation apparatus and a higher pressure exists when operation of said irrigation apparatus ceases, wherein: said automatic device includes a housing; a diaphragm dividing said housing into opposed chambers interconnected by a bleed passage, whereby, on application of said high pressure in one of said chambers, said diaphragm is moved momentarily until pressure is equalized through said bleed passage, said diaphragm being operatively connected with said valve means.

6. An automatic moisture-sensitive control system comprising: a closed porous cell adapted, when filled with water and externally wetted, to establish a low suction condition within the cell, and upon reduction of the external moisture, to create a relatively high suction condition within said cell, said cell having an inlet for water and an outlet for accumulated gases and purging water; vacuum-sensitive means communicating with said cell and operable in response to a predetermined high suction condition created in said cell; means responsive to the operation of said vacuum-sensitive means to effect eventual external rewetting of said porous cell; and cell purging means adapted to be connected with a source of water above atmospheric pressure and communicating with the inlet of said cell; said purging means including an element automatically operable for a limited period subsequent to and in response to the operation of said vacuum-sensitive means for effecting the flow of water through said cell above atmospheric pressure to purge the cell of gases which may tend to accumulate therein.

7. An automatic control system as set forth in claim 6 wherein: the means effecting rewetting of said porous cell includes an irrigation system having a plurality of irrigation valves, a plurality of actuating elements for said valves, and programming means initiated by said vacuum-sensitive means to operate said actuating elements in predetermined sequence; and said purging means incorporates an additional actuating element operative in timed relation to the other actuating elements.

8. An automatic control system as set forth in claim 6 wherein: the means effecting rewetting of said porous cell includes a series of valves and a control mechanism connected with said valves to operate said valves in a predetermined sequence; said vacuum-sensitive means is connected with said control mechanism to initiate operation thereof; and the automatic element of said purging means is a valve operated by said control mechanism.

9. An automatic control system as set forth in claim 6 wherein: the means effecting rewetting of said porous cell is an irrigating means which includes a booster valve and a pilot valve connected with said booster valve; and said vacuum-sensitive means is incorporated in said pilot valve, thereby to cause said pilot valve to operate said booster valve in response to a predetermined high suction condition in said porous cell.

10. An automatic control system as set forth in claim 6 wherein: said vacuum-sensitive means and the means responsive to the operation thereof include a valve having a control chamber in communication with said cell, an element forming a wall of said chamber movable in response to said high suction condition to open said valve, and a flow line for water above atmospheric pressure controlled by said valve, said flow line having a lower pressure when said valve is open and a higher pressure when said valve is closed; and wherein: said purging means and its automatic element include a housing, a diaphragm dividing said housing into opposed chambers interconnected by a bleed passage, one of said chambers being connected to said flow line, whereby, on application of high pressure to said chamber, said diaphragm is moved momentarily until pressure is equalized through said bleed passage, and a purge valve operatively connected with said diaphragm is provided for said porous cell.

11. An automatic moisture-sensitive control system comprising: a closed porous cell adapted, when filled with water and externally wetted, to establish a low suction condition within the cell and, upon depletion of the external moisture, to create a high suction condition within said cell, said cell having an inlet for water and an outlet for accumulated gases and for water; a vacuum-sensitive actuating means communicating with said cell and subject to control by a predetermined high suction condition created in said cell; valve means controlled by said actuating means; means responsive to said valve means to effect eventual external wetting of said cell; cell purging means adapted to be connected with a source of water above atmospheric pressure and communicating with the inlet of said cell for momentarily circulating water above atmospheric pressure through said cell to purge the cell of gases which may tend to accumulate therein; and means subject to prior operation of said vacuum-sensitive actuating means for effecting operation of said cell purging means.

12. An automatic control system as set forth in claim 11 wherein: said valve means is mechanically operated by a drive means the operation of which is initiated by said vacuum-sensitive actuating means connected with said cell.

13. An automatic control system as set forth in claim 11 wherein: said valve means is directly operated by a diaphragm forming a wall of a chamber communicating with said cell.

14. An automatic moisture-sensitive control system as set forth in claim 11, wherein: said valve means includes a series of irrigation control valves; said means responsive thereto is an irrigation device positioned to deliver a portion of the irrigation water to the exterior of said porous cell; said actuating means includes a programming controller for operating said irrigation control valves in predetermined sequence, and a vacuum-sensitive release means to initiate operation of said controller; and said cell purge operating means is an additional valve operated by said controller in timed relation with said irrigation control valves.

15. An automatic moisture-sensitive control system as set forth in claim 11, wherein: said actuating means includes a control chamber having a wall movable in response to said high suction condition to open said valve means; a flow line is provided for water above atmospheric pressure and controlled by said valve means, said flow line having a lower pressure when said valve means is open and a higher pressure when said valve means is closed; and a momentarily operative valve responsive to the rise in pressure in said flow line on closure of said valve means is included in said cell purging means.

16. An automatic control system as set forth in claim 11 wherein: said valve means is mechanically operated by a drive means the operation of which is initiated by said vacuum sensitive actuating means connected with said cell; and includes said means for effecting operation of said cell purging means, whereby said purging means is also mechanically operated by said drive means.

17. A self regulating irrigation system, comprising: a closed porous cell adapted to be liquid filled, said cell, when its exterior is exposed to an environment wet with liquid, being adapted to establish interiorly a low suction condition, and when its exterior is exposed to an environment deficient in said liquid being adapted to establish interiorly a higher suction condition; an element automatically responsive to a predetermined high suction condition within said cell; apparatus responsive to said element to effect flow of liquid to the environment of said cell to increase the moisture content of said environment; and an automatic purge means responsive to operation of said apparatus communicating with said cell and with a source of liquid above atmospheric pressure for causing momentary flow of liquid above atmospheric pressure through said cell subsequent to initiation of operation of said apparatus thereby to purge said cell of gases which may accumulate therein and refill said cell with liquid whereby said cell is reconditioned to cause operation of said apparatus in the event of re-establishment in said environment of a deficiency in said liquid.

18. A self regulating irrigation system as set forth in claim 17, wherein: said apparatus is an irrigation system including a plurality of irrigation control valves and a drive means to operate said control valves in accordance with a predetermined program, the operation of said drive means being initiated by said high suction responsive element.

19. A self regulating irrigation system as set forth in claim 17, wherein: said apparatus is an irrigation system including a plurality of irrigation control valves and a drive means to operate said control valves in accordance with a predetermined program, the operation of said drive means being initiated by said high suction responsive element; and said purge means including a valve operated by said drive means.

20. A self regulating irrigation system as set forth in claim 17, wherein: said apparatus includes a pilot valve actuated by said high suction responsive element and an irrigation flow valve is operatively connected with said pilot valve.

21. A self regulating irrigation system as set forth in claim 17, wherein: said apparatus includes a valve actuated by said high suction responsive element and liquid passing said valve is utilized to rewet the environment of said porous cell.

22. A moisture sensing device for irrigation systems, comprising: a closed porous cell adapted, when water filled and its exterior is exposed to moisture laden environment to establish interiorly a low suction condition and when its exterior is exposed to an environment deficient in water to establish interiorly a higher suction condition, said cell under the latter condition tending to accumulate gas which displaces a portion of the water therein; means responsive to a predetermined high suction condition to initiate operation of an irrigation system; a flow line connecting said porous cell to a source of water above atmospheric pressure; a drain line from said porous cell; inlet and discharge valves in said lines; and automatic means for effecting momentary opening of said valves at spaced intervals for the flow of water above atmospheric pressure through said cell to purge said cell of said accumulated gases.

23. A moisture sensing device for irrigation systems, comprising: a closed porous cell adapted, when water filled and its exterior is exposed to a moisture laden environment to establish interiorly a low suction condition and when its exterior is exposed to an environment deficient in water to establish interiorly a higher suction condition, said cell under the latter condition tending to accumulate gas which displaces a portion of the water therein; an inlet and a discharge purge valve for circulating water above atmospheric pressure through said porous cell to displace said accumulated gas; a plurality of irrigation control valves; programming means for operating said control valves in predetermined sequence and also arranged to cause momentary operation of said purge valves; and means for controlling said programming means including a timer element and a suction sensitive element connected with said porous cell.

24. A moisture sensing device for irrigation systems, as set forth in claim 23, wherein: said programming means is subject to joint operation of said elements and said purge valves are operated at a predetermined time after initiation of the operation of said control valves.

References Cited in the file of this patent

UNITED STATES PATENTS

| | | |
|---|---|---|
| 2,084,005 | Richards | June 15, 1937 |
| 2,445,717 | Richards | July 20, 1948 |
| 2,674,490 | Richards | Apr. 6, 1954 |